Patented Dec. 3, 1940

2,224,061

UNITED STATES PATENT OFFICE 2,224,061

DECOLORIZING TITANIUM TETRA-CHLORIDE

Alphonse Pechukas, Barberton, Ohio, assignor to Pittsburgh Plate Glass Company, Allegheny County, Pa., a corporation of Pennsylvania No Drawing. Application October 27, 1938, Serial No. 237,304

7 Claims. (Cl. 23—87)

This invention relates to the decolorizing of titanium tetrachloride. While pure titanium tetrachloride is a water-white liquid, the product which is obtained on the market or by the usual chlorination processes often possesses an undesirable yellow or brownish color. Prior to this invention, the removal of this color has been secured by treatment with certain metals, such as reduced iron or sodium amalgam. While the liquid may be decolorized in this manner, it is often found that it does not permanently remain colorless and is contaminated with objectionable metallic impurities. In addition, this process is expensive since considerable amounts of metal are required to decolorize the titanium tetrachloride.

In accordance with my invention, I have found that titanium tetrachloride may be decolorized to form a water-white liquid by contacting with carbon, particularly carbon having adsorptive or absorptive properties. I have found that most effective results have been obtained by using carbon black, such as lampblack, bone black, gas black, etc. However, other absorptive carbons, such as active carbon, coconut char, charcoal, petroleum coke, etc., may also be used. By treatment in this manner, the color bodies and other impurities in the titanium tetrachloride are adsorbed, absorbed or reacted upon by the carbon and are thus removed from the tetrachloride. The carbon containing the adsorbed or absorbed color bodies or their reaction products may be removed and, if desired, may be treated to separate these impurities and thus renew the activity of the carbon.

The process may be carried out in any convenient manner which will insure the required contact between the carbon and the titanium tetrachloride. I have found that the decolorizing process may be carried out rapidly by application of heat during contact. The tetrachloride may be treated either as a liquid or a vapor. When it is treated in the liquid state, it is preferred to heat the liquid in contact with the carbon under a reflux condenser for a suitable period of time and subsequently to distill and condense the purified titanium tetrachloride. Since the tetrachloride is readily hydrolyzed in a moist atmosphere, it is preferred to avoid the presence of moisture. Thus, the process may be conducted in a dry atmosphere of suitable gases, or vapors such as dry air, carbon dioxide or nitrogen. If desired, however, the process may be conducted in the substantial absence of these agents. If desired, distillation may be dispensed with and the tetrachloride after being contacted with carbon for a suitable period of time may be removed by other methods, such as by settling or filtration or both.

Where the titanium tetrachloride is to be treated in the vapor state, I have found it convenient to pass the vapors through a suitable column containing adsorptive carbon. If desired, a portion of the vapors may be permitted to condense in the column and to flow back into the still or other source of the titanium tetrachloride vapors. The process may be carried out using both vapor and liquid contact in suitable manner, for example, by heating liquid titanium tetrachloride in contact with carbon and contacting the distilling vapors with a further amount of carbon. In some cases, it is found desirable to conduct the treatment in the presence of gaseous or liquid diluents, such as air, nitrogen, carbon dioxide, silicon tetrachloride, carbon tetrachloride or stannic chloride.

The time and temperature of treatment is capable of considerable variation, being dependent upon the initial color of the liquid and the amount of carbon used. Where the decolorization is secured by liquid contact, refluxing at 125–150° C. for a period of time in excess of about 10 minutes, followed by distillation is found to be suitable. Yields of $TiCl_4$ in excess of 99 percent may be secured in this manner.

In treating the vapors, any convenient temperature above the boiling point of the titanium tetrachloride is found to be suitable.

The activity of the carbon may be decreased after extended use. The activity may be restored in any convenient manner, such as by treatment with water, solutions of acids or alkalis, etc., and subsequent heating to high temperatures for a substantial period of time. In certain cases, the carbon may be revivified merely by heating in an inert atmosphere. The extent and nature of the revivifying treatment is dependent upon the degree of contamination of the carbon.

The following examples are illustrative:

*Example I*

100 parts of yellow titanium tetrachloride and 4.1 parts of lampblack were agitated and heated under a reflux condenser at a temperature of 135° C. for a period of 15 minutes. The treated mixture was then distilled rapidly, and a water-white product was secured. The carbon was again treated with a like quantity of titanium tetrachloride which was refluxed for ½ hour, and then distilled to recover water-white material. This process was repeated twice again, with reflux times of 45 and 60 minutes respectively, yielding water-clear materials.

*Example II*

100 parts of yellow titanium tetrachloride and 4.0 parts of lampblack were agitated and heated under a reflux condenser at a temperature of 135° C. for a period of 4 hours. The treated mixture was filtered, and yielded a clear-white titanium tetrachloride.

*Example III*

A quantity of yellow titanium tetrachloride was distilled and the vapors passed through a column containing lampblack which was maintained at a temperature of 200° C. The treated vapors were condensed and a water-white liquid was thereby obtained.

Although the invention has been described in connection with the specific details of certain embodiments thereof, it is not intended that such details shall be regarded as limitations upon the scope of the invention except insofar as included in the accompanying claims.

While the process has been described with particular reference to the treatment of titanium tetrachloride, it is not so limited since other tetrahalides, such as titanium tetrabromide or tetrafluoride may be decolorized in similar manner.

I claim:
1. A process of decolorizing previously produced colored titanium tetrachloride which comprises heating the same with carbon.
2. A process of decolorizing previously produced colored titanium tetrachloride which comprises heating the same with carbon black.
3. A process of decolorizing previously produced colored titanium tetrachloride which comprises contacting the same with absorptive carbon and subsequently distilling the treated titanium tetrachloride.
4. A process of decolorizing previously produced colored titanium tetrachloride which comprises contacting vapors of said tetrachloride with carbon.
5. A process of decolorizing previously produced colored titanium tetrachloride which comprises contacting the same with carbon and removing the carbon.
6. A process of decolorizing previously produced colored titanium tetrahalide which comprises contacting the same with carbon and removing the carbon.
7. A process of decolorizing previously produced colored titanium tetrachloride which comprises contacting the same with lamp black and removing the lamp black.

ALPHONSE PECHUKAS.